(12) United States Patent
Pipard et al.

(10) Patent No.: US 11,279,984 B2
(45) Date of Patent: *Mar. 22, 2022

(54) HIGH-STRENGTH COLD ROLLED STEEL SHEET HAVING HIGH FORMABILITY AND A METHOD OF MANUFACTURING THEREOF

(71) Applicant: ArcelorMittal, Luxembourg (LU)

(72) Inventors: Jean-Marc Pipard, Vaux (FR); Marc Olivier Thenot, Malancourt-la-Montagne (FR); Pierre Targy, Metz (FR)

(73) Assignee: ArcelorMittal, Luxembourg (LU)

( * ) Notice: Subject to any disclaimer, the term of this patent is extended or adjusted under 35 U.S.C. 154(b) by 227 days.

This patent is subject to a terminal disclaimer.

(21) Appl. No.: 16/470,728

(22) PCT Filed: Dec. 19, 2017

(86) PCT No.: PCT/IB2017/058119
§ 371 (c)(1),
(2) Date: Jun. 18, 2019

(87) PCT Pub. No.: WO2018/116155
PCT Pub. Date: Jun. 28, 2018

(65) Prior Publication Data
US 2019/0338385 A1     Nov. 7, 2019

(30) Foreign Application Priority Data

Dec. 21, 2016  (WO) ................. PCT/IB2016/057903

(51) Int. Cl.
| | | |
|---|---|---|
| C21D 8/02 | (2006.01) | |
| C22C 38/00 | (2006.01) | |
| C22C 38/06 | (2006.01) | |
| C22C 38/34 | (2006.01) | |
| C22C 38/38 | (2006.01) | |
| C21D 1/19 | (2006.01) | |
| C22C 38/24 | (2006.01) | |
| C22C 38/26 | (2006.01) | |
| C22C 38/28 | (2006.01) | |

(52) U.S. Cl.
CPC ............ *C21D 8/0236* (2013.01); *C21D 1/19* (2013.01); *C21D 8/0226* (2013.01); *C21D 8/0263* (2013.01); *C22C 38/001* (2013.01); *C22C 38/002* (2013.01); *C22C 38/06* (2013.01); *C22C 38/24* (2013.01); *C22C 38/26* (2013.01); *C22C 38/28* (2013.01); *C22C 38/34* (2013.01); *C22C 38/38* (2013.01); *C21D 2211/001* (2013.01); *C21D 2211/002* (2013.01); *C21D 2211/008* (2013.01)

(58) Field of Classification Search
CPC ...... C21D 8/0236; C21D 1/19; C21D 8/0226; C21D 8/0263; C21D 2211/001; C21D 2211/002; C21D 2211/008; C22C 38/001; C22C 38/002; C22C 38/06; C22C 38/24; C22C 38/26; C22C 38/28; C22C 38/34; C22C 38/38
See application file for complete search history.

(56) References Cited

U.S. PATENT DOCUMENTS

| | | | |
|---|---|---|---|
| 7,780,799 B2 | 8/2010 | Goto et al. | |
| 9,074,272 B2 | 7/2015 | Akamizu et al. | |
| 9,631,250 B2 | 4/2017 | Kawabe et al. | |
| 10,570,473 B2 | 2/2020 | Tsunezawa et al. | |
| 10,612,106 B2 | 4/2020 | Gil Otin et al. | |
| 2011/0146852 A1 | 6/2011 | Matsuda et al. | |
| 2011/0186189 A1 | 8/2011 | Futamura | |
| 2013/0192726 A1 | 8/2013 | Chen et al. | |
| 2014/0162088 A1 | 6/2014 | Kawata et al. | |
| 2014/0170439 A1* | 6/2014 | Allain ................ | C21D 9/46 428/659 |
| 2014/0170440 A1 | 6/2014 | Kawata et al. | |
| 2015/0101712 A1 | 4/2015 | Futamura et al. | |
| 2015/0203947 A1 | 7/2015 | Hasegawa et al. | |
| 2016/0160309 A1* | 6/2016 | Allain ................ | C22C 38/42 148/504 |
| 2016/0369369 A1* | 12/2016 | Takashima .......... | C21D 9/46 |

(Continued)

FOREIGN PATENT DOCUMENTS

| | | |
|---|---|---|
| CN | 103993226 A | 8/2014 |
| CN | 104508163 A | 4/2015 |

(Continued)

OTHER PUBLICATIONS

The International Search Report issued in connection with International application No. PCT/IB2017/058119 dated Mar. 8, 2018.

(Continued)

*Primary Examiner* — Christopher S Kessler
*Assistant Examiner* — Andrew M Cheung
(74) *Attorney, Agent, or Firm* — Davidson, Davidson & Kappel, LLC

(57) ABSTRACT

A cold rolled steel sheet, the steel containing, in weight percentage,
0.19%≤carbon≤0.24%,
1.9%≤manganese≤2.2%,
1.4%≤silicon≤1.6%,
0.01%≤aluminum≤0.06%,
0.2%≤chromium≤0.5%,
phosphorus≤0.02%,
sulfur≤0.003%,
the balance including iron and unavoidable impurities, the steel sheet having a microstructure containing 5% to 15% of tempered martensite, 10% to 15% of residual austenite, the balance containing bainite, bainite content being at least 70%, is described. Also described is a manufacturing method and with use of such grade for making vehicle parts.

8 Claims, No Drawings

(56) References Cited

U.S. PATENT DOCUMENTS

| | | |
|---|---|---|
| 2017/0096723 A1 | 3/2017 | Kasuya et al. |
| 2017/0152579 A1 | 6/2017 | Mohanty et al. |
| 2017/0268077 A1 | 9/2017 | Murakami et al. |

FOREIGN PATENT DOCUMENTS

| | | | |
|---|---|---|---|
| EP | 3101147 A1 | 12/2016 | |
| JP | S62182224 | 8/1987 | |
| JP | 2010526935 A | 8/2010 | |
| JP | 2014514459 A | 6/2014 | |
| JP | 2015224359 A | 12/2015 | |
| JP | 2016098427 A | 5/2016 | |
| JP | 2016191125 A | 11/2016 | |
| JP | 2017527690 A | 9/2017 | |
| KR | 20110039395 | 4/2011 | |
| KR | 20160127120 | 11/2016 | |
| RU | 2312163 C2 | 12/2007 | |
| RU | 2556253 C1 | 7/2015 | |
| RU | 2557035 C1 | 7/2015 | |
| RU | 2557862 C1 | 7/2015 | |
| WO | WO-2015011511 A1 * | 1/2015 | ............... C23C 2/28 |
| WO | 2015141097 A1 | 9/2015 | |
| WO | 2016001700 A1 | 1/2016 | |

OTHER PUBLICATIONS

The International Search Report issued in connection with International application No. PCT/IB2016/057903 dated Aug. 22, 2017.

* cited by examiner

HIGH-STRENGTH COLD ROLLED STEEL SHEET HAVING HIGH FORMABILITY AND A METHOD OF MANUFACTURING THEREOF

FIELD OF THE INVENTION

The present invention relates to cold rolled steel sheet with high strength and high formability having tensile strength of 1150 MPa or more and a hole expansion ratio of more than 30% which is suitable for use as a steel sheet for vehicles.

BACKGROUND

Automotive parts are required to satisfy two inconsistent necessities, viz. ease of forming and strength. In recent years, a third requirement of improvement in fuel consumption is also bestowed upon automobiles in view of global environment concerns. Thus, now automotive parts must be made of material having high formability in order to fit in the criteria of ease of fit in the intricate automobile assembly and, at same time, have to improve strength for vehicle crashworthiness and durability while reducing weight of vehicle to improve fuel efficiency.

Therefore, intense research and development endeavors are put in to reduce the amount of material utilized in car by increasing the strength of material. Conversely, an increase in strength of steel sheets decreases formability, and thus development of materials having both high strength and high formability is necessitated.

Earlier research and developments in the field of high strength and high formability steel sheets have resulted in several methods for producing high strength and high formability steel sheets, some of which are enumerated herein for conclusive appreciation of the present invention.

U.S. Pat. No. 9,074,272 describes steels that have the chemical composition: 0.1-0.28% C, 1.0-2.0% Si, 1.0-3.0% Mn and the remainder consisting of iron and the inevitable impurities. The microstructure includes residual austenite between 5 to 20%, bainitic ferrite 40 to 65%, polygonal ferrite 30 to 50% and less than 5% martensite.

U.S. Pat. No. 9,074,272 refers to a cold rolled steel sheet with excellent elongation, but the invention described in it fails to achieve the strength of 900 Mpa, which is a mandate for reducing the weight while keeping the complex automotive part robust.

The known prior art related to the manufacture of high strength and high formability steel sheets is inflicted by one or the other lacuna. Hence, there is a need for a cold rolled steel sheet having high strength and high formability and a method of manufacturing the same.

SUMMARY OF THE INVENTION

The present invention provides cold-rolled steel sheets that simultaneously have:
- an ultimate tensile strength greater than or equal to 1150 MPa and preferably above 1180 MPa, or even above 1220 MPa,
- a total elongation greater than or equal to 13% and preferably greater than or equal to 14%, and
- a hole expansion ratio of 30% or more and preferably 40% or more.

In one embodiment, the steel sheet according to the present invention has a yield strength value greater than or above 850 MPa.

Preferably, such steel can also have a good suitability for forming, in particular for rolling with good weldability and coatability.

The present invention further provides a method for the manufacturing of these sheets that is compatible with conventional industrial applications while being robust towards manufacturing parameters shifts.

The present invention also provides a cold rolled steel sheet, the steel comprising, in weight percentage,
- 0.19%≤carbon≤0.24%,
- 1.9%≤manganese≤2.2%,
- 1.4%≤silicon≤1.6%,
- 0.01%≤aluminum≤0.06%,
- 0.2%≤chromium≤0.5%,
- phosphorus≤0.02%,
- sulfur≤0.03%, the balance comprising iron and unavoidable impurities, the steel sheet having a microstructure comprising 5% to 15% of tempered martensite, 10% to 15% of residual austenite, the balance comprising bainite, wherein bainite content is at least 70/a %.

In some embodiments, the composition includes 2.0%0/to 2.2% of manganese. In some embodiments, the composition includes a maximum of 0.013% of phosphorus. In some embodiments, the microstructure contains more than 75% of bainite. In some embodiments, residual austenite has a carbon concentration between 0.9 and 1.15%. In some embodiments, the steel sheet has a tensile strength greater than or equal to 1150 MPa, a hole elongation ratio greater than or equal to 30% and a total elongation greater than or equal to 13%. In some embodiments, the steel sheet has a tensile strength above 1200 MPa and a hole expansion ratio greater than or equal to 40%. In some embodiments, the steel sheet has a total elongation of at least 14%.

The present invention also provides a method of manufacturing of a cold rolled steel comprising the following successive steps:

providing a steel composition described above to obtain a semi-finished product;

reheating said semi-finished product to a temperature between 1000° C. and 1280° C.;

rolling the said semi-finished product completely in an austenitic range at a hot rolling finishing temperature greater than or equal to 850° C. to obtain a hot rolled steel sheet;

cooling the hot rolled steel sheet at a cooling rate above 30° C./s to a coiling temperature below or equal to 600° C.; and coiling said hot rolled sheet;

cooling said hot rolled sheet;

subjecting said hot rolled steel sheet to an annealing at a temperature between 400 and 750° C. during 1 h to 96 h;

cold rolling said hot rolled steel sheet with a reduction rate between 35 and 90% to obtain a cold rolled steel sheet;

then continuously annealing said cold rolled steel sheet at a rate between 1 to 20° C./s to a soaking temperature between Ac3 and Ac3+50° C. during at least 100 s, the temperature and time being selected to obtain a percentage of 100% austenite;

then cooling said cold rolled steel sheet at a rate greater than 20° C./s to a temperature between Ms−10° C. and Ms+10° C., wherein Ms is the Ms temperature of the initial austenite prior cooling and then holding said cold rolled steel sheet between 350 and 450° C. for a time of 250 to 1000 s; then cooling said cold rolled steel sheet down to room temperature at a cooling rate not more than 200° C./s. In some embodiments, the coiling temperature of the hot rolled steel sheet is set between 350 and 600° C. In some embodiments, the cold rolled steel sheet is continuously annealed between 840° C. and 900° C. between 100 and 1000 s. In some embodiments, the cold rolled steel sheet is further coated with zinc or a zinc based alloy.

The present invention further provides a structural or safety part of a vehicle comprising a steel sheet as described above or of a steel sheet produced according to a method described above, and a vehicle comprising such a structural or safety part.

Other characteristics and advantages of the invention will become apparent from the following detailed description of the invention.

DETAILED DESCRIPTION

Carbon is present in the steel sheets of the present invention between 0.19% and 0.24%. Carbon is an element necessary for increasing the strength of a steel sheet by producing a low-temperature transformation phase such as martensite. Further, carbon also plays a pivotal role in austenite stabilization. A content less than 0.19% would allow neither stabilizing austenite nor securing at least 5% of martensite, thereby decreasing strength as well as ductility. On the other hand, at a carbon content exceeding 0.24%, a weld zone and a heat-affected zone are significantly hardened, and thus the mechanical properties of the weld zone are impaired.

Manganese content of the steel of present invention is between 1.9% and 2.2%. Manganese is an element that imparts strength as well as stabilizes austenite to obtain residual austenite. An amount of at least about 1.9% by weight of manganese has been found to provide the strength and hardenability of the steel sheet as well as to stabilize austenite. Thus, a higher percentage of manganese such as 2.0 to 2.2% is preferred. But when manganese is more than 2.2%, this produces adverse effects such as slowing down the transformation of austenite to bainite during the isothermal holding for bainite transformation, leading to a reduction of ductility. Moreover, a manganese content above 2.2% would also reduce the weldability of the present steel.

Silicon content of the steel of present invention is between 1.4% and 1.6%. Silicon is a constituent that retards the precipitation of carbon from austenite. Therefore, due to the presence of 1.4% of silicon, carbon-rich austenite is stabilized at room temperature. However, adding more than 1.6% of silicon does not improve the mentioned effect and leads to problems such as hot rolling embrittlement. Therefore, the concentration is controlled within an upper limit of 1.6%.

The content of aluminum of the steel of the present invention is between 0.01 and 0.06%. Within such range, aluminum bounds nitrogen in the steel to form aluminum nitride so as to reduce the size of the grains. But, whenever the content of aluminum exceeds 0.06% in the present invention, it will increase the Ac3 point, thereby lowering the productivity.

Chromium content of the steel of present invention is between 0.2% and 0.5%. Chromium is an essential element that provide strength and hardening to the steel, but when used above 0.5% impairs surface finish of the steel.

Phosphorus content of the steel of present invention is limited to 0.02%. Phosphorus is an element which hardens in solid solution and also interferes with formation of carbides. Therefore, a small amount of phosphorus, of at least 0.002% can be advantageous, but phosphorus has adverse effects also, such as a reduction of the spot weldability and the hot ductility, particularly due to its tendency to segregation at the grain boundaries or co-segregation with manganese. For these reasons, its content is preferably limited a maximum of 0.013%.

Sulfur is not an essential element but may be contained as an impurity in steel. The sulfur content is preferably as low as possible, but is 0.03% or less, and preferably at most 0.003%, from the viewpoint of manufacturing cost. Further if higher sulfur is present in steel it combine to form sulfide especially with Mn and Ti and reduces their beneficial impact on the present invention.

Niobium is an optional element that can be added to the steel up to 0.06%, preferably between 0.0010 and 0.06%. It is suitable for forming carbonitrides to impart strength to the steel according to the present invention by precipitation hardening. Because niobium delays the recrystallization during the heating, the microstructure formed at the end of the holding temperature and as a consequence after the complete annealing is finer, this leads to the hardening of the product. But, when the niobium content is above 0.06% the amount of carbo-nitrides is not favorable for the present invention as large amount of carbo-nitrides tend to reduce the ductility of the steel.

Titanium is an optional element which may be added to the steel of the present invention up to 0.08%, preferably between 0.001% and 0.08%. As niobium, it is involved in carbo-nitrides, so it plays a role in hardening. But it is also involved to form TiN appearing during solidification of the cast product. The amount of Ti is so limited to 0.08% to avoid coarse TiN detrimental for hole expansion. In case, the titanium content is below 0.001%, it does not impart any effect on the steel of present invention.

Vanadium is an optional element which may be added to the steel of the present invention up to 0.1%, preferably between 0.001% and 0.01%. As niobium, it is involved in carbo-nitrides, so it plays a role in hardening. But it is also involved to form VN appearing during solidification of the cast product. The amount of V is so limited to 0.1%, to avoid coarse VN detrimental for hole expansion. In case the vanadium content is below 0.001%, it does not impart any effect on the steel of present invention.

Calcium is an optional element which may be added to the steel of present invention up to 0.005%, preferably between 0.001% and 0.005%. Calcium is added to steel of present invention as an optional element especially during the inclusion treatment. Calcium contributes towards the refining of the steel by arresting the detrimental sulphur content in globularizing it.

Other elements such as cerium, boron, magnesium or zirconium can be added individually or in combination in the following proportions: Ce≤0.1%, B≤0.01%, Mg≤0.05% and Zr≤0.05%. Up to the maximum content levels indicated, these elements make it possible to refine the grain during solidification.

The remainder of the composition of the steel consists of iron and inevitable impurities resulting from processing.

The microstructure of the steel sheet according to the present invention comprises 5% to 15% of tempered martensite, 10% to 15% of residual austenite and optionally up to 5% of ferrite in area fractions, the balance being made of bainite, bainite content being at least 70%.

Bainite is the matrix of the steel and is contained in a minimum of 70%, preferably of 75%. In the frame of the present invention, bainite consists in lath bainite and granular bainite. Granular bainite is a bainite having a very low density of carbides, meaning that the steel includes less than 100 carbides per area unit of 100 µm². Lath bainite is in the form of thin ferrite laths with carbide formed between the laths. The size of carbides present between the laths is such that the number of carbides bigger than 0.1 micron is below 50,000/mm². The lath bainite provides the steel with adequate hole expansion whereas the granular bainite provides an improved elongation.

Tempered martensite is contained in an amount of 5 to 15%. If the content of tempered martensite is less than 5% it would be difficult to achieve the strength level of 1150 MPa and if the martensite amount reaches beyond 15%, it would be detrimental for the weldability of steel as well as adversely impact the ductility.

Residual austenite is contained in an amount of 10 to 15%. It is known to have a higher solubility of carbon than bainite and hence acts as effective carbon trap, therefore retarding the formation of carbides in bainite. The retained austenite of the present invention preferably contains carbon between 0.9 and 1.15%, with an average content of carbon in austenite of 1.00%. Hence the balance of carbon between the bainite and austenite facilitates the hot rolling in austenitic range while allowing bainite grains to impart mechanical properties such as formability and elongation. In addition, austenite also imparts ductility to the present steel.

Tempered martensite and residual austenite can present in the steel according to the present invention, as isolate phases or under the form of martensite-austenite islands, which is preferred.

Ferrite may be present in the microstructure of steel according to the present invention as an incidental microstructure due to a low cooling rate for instance. Such ferrite may comprise polygonal ferrite, lath ferrite, acicular ferrite, plate ferrite or epitaxial ferrite. The presence of ferrite in the present invention may impart the steel with formability and elongation and also to a certain degree resistance to fatigue failure. But it may also have negative impacts due to the fact that ferrite increases the gap in hardness with hard phases such as martensite and bainite and reduces local ductility, resulting in lower hole expansion ratio. Its presence is therefore limited to a maximum of 5%.

The steel sheet according to the present invention may be obtained by any appropriate method. It is however preferred to use the process according to the present invention, which comprises the following successive steps:

providing a steel composition according to the present invention to obtain a semi-finished product, reheating said semi-finished product to a temperature between 1000° C. and 1280° C.;

rolling the said semi-finished product completely in an austenitic range, wherein the hot rolling finishing temperature is greater than or equal to 850° C. to obtain a hot rolled steel sheet;

cooling the hot rolled steel sheet at a cooling rate above 30° C./s to a coiling temperature below or equal to 600° C.; and coiling the said hot rolled sheet;

cooling the said hot rolled steel sheet;

optionally performing scale removal process on said hot rolled steel sheet;

subjecting the hot rolled steel sheet to an annealing at a temperature between 400 and 750° C. during 1 h to 96 h;

optionally performing scale removal process on said hot rolled annealed steel sheet;

cold rolling the said hot rolled steel sheet with a reduction rate between 35 and 90% to obtain a cold rolled steel sheet;

then continuously annealing the said cold rolled steel sheet at a rate between 1 to 20° C./s to a soaking temperature between Ac3 and Ac3+50° C. during at least 100 s, the temperature and time being selected to obtain an percentage of 100% austenite;

then cooling the sheet at a rate greater than 20° C./s to a temperature between Ms−10° C. and Ms+10° C., wherein Ms is the Ms temperature of the initial austenite prior cooling and then holding the cold rolled steel sheet between 350 and 450° C. for a time of 250 to 1000 s; then cooling the sheet down to room temperature at a cooling rate not more than 200° C./s.

Such process includes providing a semi-finished product of steel with a chemical composition according to the present invention. The semi-finished product can be casted either into ingots or continuously in form of thin slabs or thin strips, i.e. with a thickness ranging from approximately 220 mm for slabs up to several tens of millimeters for thin strip, for example.

For the purpose of simplification of the present invention, a slab will be considered as a semi-finished product. A slab having the above-described chemical composition is manufactured by continuous casting, wherein the slab preferably underwent a direct soft reduction during casting to ensure the elimination of central segregation and porosity reduction. The slab provided by continuous casting process can be used directly at a high temperature after the continuous casting or may be first cooled to room temperature and then reheated for hot rolling.

The temperature of the slab which is subjected to hot rolling is preferably at least 1000° C., preferably above 1200° C. and must be below 1280° C. In case the temperature of the slab is lower than 1000° C., excessive load is imposed on a rolling mill, and further, the temperature of the steel may decrease to a ferrite transformation temperature during finishing rolling, whereby the steel will be rolled in a state in which transformed ferrite contained in the structure. Further, the temperature must not be above 1280° C. as there would be a risk of formation of rough ferrite grains resulting in coarse ferrite grain which decreases the capacity of these grains to re-crystallize during hot rolling. The larger the initial ferrite grain size, the less easily it re-crystallizes, which means that reheat temperatures above 1280° C. must be avoided because they are industrially expensive and unfavorable in terms of the recrystallization of ferrite.

The temperature of the slab is preferably sufficiently high so that hot rolling can be completed entirely in the austenitic range, the finishing hot rolling temperature remaining above 850° C. and preferably above 900° C. It is necessary that the final rolling be performed above 850 C, because below this temperature the steel sheet exhibits a significant drop in rollability. A final rolling temperature between 900 and 950° C. is preferred to have a structure that is favorable to recrystallization and rolling.

The sheet obtained in this manner is then cooled at a cooling rate above 30° C./s to the coiling temperature which below 600° C. Preferably, the cooling rate will be less than or equal to 65° C./s and above 35° C./s. The coiling temperature is preferably above 350° C. to avoid the transformation of austenite into ferrite and perlite and to contribute in forming an homogenous bainite and martensite microstructure.

The coiled hot rolled steel sheet may be cooled down to room temperature before subjecting it to hot band annealing or may be send to hot band annealing directly.

Hot rolled steel sheet may be subjected to an optional pickling to remove the scale formed during the hot rolling, if needed. The hot rolled sheet is then subjected to an annealing at a temperature between 400° C. and 750° C. during 1 to 96 hours. The temperature of such hot band annealing is defined in accordance with the targeted percentage of bainite, as higher the temperature more is the percentage of bainite and in particular of granular bainite. This is triggered by the refining of the prior austenite grain size. Thereafter, pickling of this hot rolled and annealed steel sheet may be performed if necessary to remove the scale.

The hot rolled and annealed sheets are then cold rolled with a thickness reduction between 35 to 90%. The cold rolled steel sheet is then subjected to annealing to impart the steel of present invention with targeted microstructure and mechanical properties.

To continuously anneal the cold rolled steel sheet, it is first heated at a heating rate between 1 and 20° C./s, preferably greater than 3° C./s, to a soaking temperature between Ac3 and Ac3+50° C. during at least 100 s and preferably not more than 1000 s. The temperature and time are selected to ensure a complete re-crystallization, i.e. to obtain a percentage of 100% austenite. Ac3 for the steel according to the invention is usually between 840 and 900° C.

The sheet is then cooled at a cooling rate of more than 20° C./s until reaching Ms+/−10° C. wherein $M_s$ is the $M_s$ temperature of the initial austenite prior cooling. The cooling stop temperature should be as close as possible to $M_s$. In a preferred embodiment, the cooling rate is greater than 30° C./s.

Then, the temperature of cold rolled steel sheet is increased to 350 to 450° C., the rise in temperature from $M_s$+/−10° C. to a temperature between 350 and 450° C. being due to a recalescence phenomenon. The steel sheet is then held at 350 to 450° C. for a time of at least 250 s but not more than 1000 s. This isothermal overaging stabilizes the carbon rich austenite and contributes to the formation and stabilization of low density carbide bainite, conferring the steel of present invention with targeted mechanical properties.

The cold rolled steel sheet is then cooled to room temperature at a cooling rate not more than 200° C./s. During this cooling unstable residual austenite may transform to fresh martensite in form of MA islands.

An optional skin pass operation with a reduction rate below 0.6% may be performed at that stage.

The heat treated cold rolled sheet may then be optionally coated by electrodeposition or vacuum coating or any other suitable process.

A post batch annealing, preferably done at 170 to 210° C. during 12 h to 30 h can be done optionally after annealing on uncoated product or after coating on coated product in order to reduce hardness gradient between phases and ensure degasing for coated products.

EXAMPLES

The following tests and examples presented herein are non-restricting in nature and must be considered for purposes of illustration only, and will display, e.g., the advantageous features of the present invention and expound the significance of the parameters chosen by inventors after extensive experiments and further establish the properties that can be achieved by the steel according to the present invention.

Samples of the steel sheets according to the present invention and to some comparative grades were prepared with the compositions gathered in table 1 and the processing parameters gathered in table 2. The corresponding microstructures of those steel sheets were gathered in table 3 and the properties in table 4.

Table 1 depicts the steels with the compositions expressed in percentages by weight.

TABLE 1 composition of the trials

| Grade | C | Mn | Si | Al | Cr | P | S | N | Nb | Ti | V | Ca |
|---|---|---|---|---|---|---|---|---|---|---|---|---|
| 1* | 0.212 | 2.09 | 1.512 | 0.042 | 0.352 | 0.011 | 0.002 | 0.007 | 0.010 | 0.005 | — | — |
| 2* | 0.213 | 2.08 | 1.490 | 0.034 | 0.357 | 0.010 | 0.001 | 0.004 | 0.002 | 0.005 | 0.002 | 0.001 |
| 3* | 0.213 | 2.10 | 1.510 | 0.037 | 0.342 | 0.010 | 0.002 | 0.005 | 0.002 | 0.005 | 0.002 | 0.002 |
| 4* | 0.204 | 2.11 | 1.500 | 0.035 | 0.308 | 0.009 | 0.001 | 0.005 | 0.002 | 0.005 | — | 0.001 |
| 5 | 0.207 | 2.09 | 1.480 | 0.026 | <u>0.675</u> | 0.010 | 0.002 | 0.005 | 0.002 | 0.004 | — | — |
| 6 | 0.195 | 2.17 | <u>1.890</u> | 0.020 | 0.340 | 0.012 | 0.002 | 0.005 | 0.002 | 0.004 | — | — |
| 7 | 0.195 | 2.18 | <u>1.890</u> | 0.021 | <u>0.650</u> | 0.012 | 0.002 | 0.005 | 0.002 | 0.004 | — | — |
| 8* | 0.208 | 2.09 | 1.500 | 0.028 | 0.363 | 0.011 | 0.002 | 0.005 | 0.002 | 0.004 | — | — |

*= according to the present invention; underlined values: not according to the present invention.

Table 2 gathers the annealing process parameters implemented on steels of Table 1.

Table 1 also shows Bainite transformation Bs and Martensite transformation Ms temperatures of inventive steel and reference steel. The calculation of Bs and Ms is done by using Van Bohemen formula published in Materials Science and Technology (2012) vol 28, no 4, pp 487-495, which is as follows:

$$Bs=839-(86*[Mn]+23*[Si]+67*[Cr]+33*[Ni]+75*[Mo])-270*(1-EXP(-1.33*[C]))$$

$$Ms=565-(31*[Mn]+13*[Si]+10*[Cr]+18*[Ni]+12*[Mo])-600*(1-EXP(-0.96*[C]))$$

Further, before performing the annealing treatment on the steels of invention as well as reference, the samples were heated to a temperature between 1000° C. and 1280° C., and then subjected to hot rolling with finish temperature above 850° C., and thereafter were coiled at a temperature below 600° C. The hot rolled coil is then processed as claimed and thereafter after cold rolled with a thickness reduction between 35 to 90%.

TABLE 2 process parameters of the trials

| | | | | | | Annealing | | | | | | Overaging | | |
|---|---|---|---|---|---|---|---|---|---|---|---|---|---|---|
| Trials | Grade | Bs (° C.) | Ms (° C.) | Coiling T (° C.) | HBA T (° C.) | Heating rate (° C./s) | Soaking T (° C.) | Soaking t (s) | T stop (° C.) | Cooling rate (° C./s) | T entry (° C.) | T exit (° C.) | t (s) |
| I1 | 1 | 533 | 365 | 450 | 620 | 2.5 | 868 | 155 | 358 | 39 | 402 | 411 | 366 |
| I2 | 2 | 535 | 366 | 450 | 650 | 2.6 | 851 | 155 | 360 | 39 | 392 | 405 | 366 |
| I3 | 3 | 533 | 365 | 450 | 650 | 2.6 | 844 | 155 | 357 | 34 | 395 | 405 | 366 |
| I4 | 4 | 539 | 370 | 560 | 450 | 2.5 | 857 | 155 | 367 | 55 | 398 | 414 | 366 |
| R1 | <u>5</u> | 514 | 366 | 560 | 560 | 6.0 | 880 | 120 | <u>400</u> | 50 | 400 | 400 | 300 |
| R2 | <u>6</u> | 524 | 367 | 560 | 560 | 6.0 | 880 | 120 | <u>400</u> | 50 | 400 | 400 | 300 |
| R3 | <u>7</u> | 502 | 364 | 560 | 560 | 6.0 | 880 | 120 | <u>400</u> | 50 | 400 | 400 | 300 |
| R4 | 8 | 535 | 368 | 560 | 560 | 6.0 | <u>830</u> | 120 | 375 | 50 | 375 | 400 | 300 |
| R5 | 1 | 534 | 366 | 550 | 560 | 2.1 | 872 | 186 | <u>348</u> | 34 | <u>334</u> | 404 | 439 | underlined values: not according to the present invention.
HBA: annealing of hot rolled steel sheet Table 3 gathers the results of test conducted in accordance of standards on different microscopes such as Scanning Electron Microscope for determining microstructural composition of both the inventive steel and reference trials.

TABLE 3 microstructures of the trials

| Trials | Bainite | Tempered martensite | Residual austenite | % C in austenite | Ferrite |
|---|---|---|---|---|---|
| I1 | 75 | 12 | 13 | 1.10 | 0 |
| I2 | 77 | 11 | 12 | 1.12 | 0 |
| I3 | 74 | 12 | 12 | 1.08 | 2 |
| I4 | 76 | 12 | 12 | 1.03 | 0 |
| R1 | 75 | 13 | 12 | 1.14 | 0 |
| R2 | <u>69</u> | 12 | 11 | 1.10 | 8 |
| R3 | <u>68</u> | 15 | 12 | 1.04 | 5 |
| R4 | <u>60</u> | 10 | 12 | 1.15 | <u>18</u> |
| R5 | <u>66</u> | <u>22</u> | 12 | 1.15 | 0 | underlined values: not according to the present invention.

Table 4 gathers the mechanical properties of both the inventive steel and reference steel. The tensile strength, yield strength and total elongation test are conducted in accordance with JIS Z2241 standards, whereas to estimate hole expansion, a test called hole expansion is applied according the standard ISO16630:2009. In this test, sample is subjected to punching to form a hole of 10 mm (=Di) and deformed. After deformation, the hole diameter Df was measured and the hole expansion ratio (HER) is calculated using the under formula:

HER %=100*(Df−Di)/Di

TABLE 4 mechanical properties of the trials

| Trials | Tensile Strength (MPa) | Yield Strength (MPa) | Total Elongation (%) | HER (%) |
|---|---|---|---|---|
| I1 | 1242 | 959 | 14.5 | 41.0 |
| I2 | 1227 | 976 | 14.2 | 47.7 |
| I3 | 1235 | 982 | 14.5 | 45.2 |
| I4 | 1222 | 869 | 14.3 | 40.0 |
| R1 | 1287 | 898 | 13.3 | <u>22.9</u> |
| R2 | 1252 | 863 | 15.7 | <u>28.7</u> |
| R3 | 1345 | 925 | 14.5 | <u>22.1</u> |
| R4 | 1174 | 827 | 16.8 | <u>23.5</u> |
| R5 | 1325 | 1108 | <u>12.2</u> | 32.0 | underlined values: not according to the invention.

The examples show that the steel sheets according to the present invention are the only one to show all the targeted properties thanks to their specific composition and microstructures.

What is claimed is:

1. A method of manufacturing a cold rolled steel comprising the following successive steps:
   providing a steel composition comprising, in weight percentage,
   0.19%≤carbon≤0.24%,
   1.9%≤manganese≤2.2%,
   1.4%≤silicon≤1.6%,
   0.01%≤aluminum≤0.06%,
   0.2%≤chromium≤0.5%,
   phosphorus≤0.02%,
   sulfur≤0.03%, and
   a balance comprising iron and unavoidable impurities, to obtain a semi-finished product;
   reheating said semi-finished product to a temperature between 1000° C. and 1280° C.;
   rolling the said semi-finished product completely in an austenitic range at a hot rolling finishing temperature greater than or equal to 850° C. to obtain a hot rolled steel sheet;
   cooling the hot rolled steel sheet at a cooling rate above 30° C./s to a coiling temperature below or equal to 600° C.; and coiling said hot rolled sheet;
   cooling said hot rolled sheet;
   subjecting said hot rolled steel sheet to an annealing at a temperature between 400 and 750° C. for 1 h to 96 h;
   cold rolling said hot rolled steel sheet with a reduction rate between 35 and 90% to obtain a cold rolled steel sheet;
   then continuously annealing said cold rolled steel sheet at a rate between 1 to 20° C./s to a soaking temperature between Ac3 and Ac3+500° C. for at least 100 s;
   then cooling said cold rolled steel sheet at a rate greater than 20° C./s to a temperature between Ms−10° C. and Ms+10° C., wherein Ms is the Ms temperature of the initial austenite prior cooling and then holding said cold rolled steel sheet between 350 and 450° C. for a time of 250 to 1000 s; and then cooling said cold rolled steel sheet down to room temperature at a cooling rate not more than 200° C./s.

2. A method according to claim 1, wherein the coiling temperature of the hot rolled steel sheet is set between 350 and 600° C.

3. A method according to claim 1, wherein the cold rolled steel sheet is continuously annealed between 840° C. and 900° C. between 100 and 1000 s.

4. A method according to claim 1, wherein the cold rolled steel sheet is further coated with zinc or a zinc based alloy.

5. A method according to claim 1, further comprising performing scale removal process on said hot rolled steel sheet.

6. A method of claim 1, further comprising performing scale removal process after annealing on said hot rolled steel sheet.

7. A method according to claim 1, wherein said cold rolled steel sheet after said cooling has a tensile strength greater than or equal to 1150 MPa, a hole elongation ratio greater than or equal to 30% and a total elongation greater than or equal to 13%.

8. A method according to claim 1, wherein said cold rolled steel sheet after said cooling has a microstructure comprising less than 5% polygonal ferrite.

* * * * *